(12) United States Patent
Schmidt

(10) Patent No.: US 11,836,729 B2
(45) Date of Patent: Dec. 5, 2023

(54) QUALITY ASSURANCE SYSTEM FOR AUTHENTICATING ONLINE MERCHANT ACTIVITY

(71) Applicant: Capped Out Media, Taylorsville, UT (US)

(72) Inventor: Waynard Schmidt, Taylorsville, UT (US)

(73) Assignee: Capped Out Media, Taylorsville, UT (US)

(*) Notice: Subject to any disclaimer, the term of this patent is extended or adjusted under 35 U.S.C. 154(b) by 0 days.

(21) Appl. No.: 17/507,737

(22) Filed: Oct. 21, 2021

(65) Prior Publication Data
US 2023/0130613 A1    Apr. 27, 2023

(51) Int. Cl.
*G06Q 30/00*     (2023.01)
*G06Q 20/40*     (2012.01)
*G06Q 30/0214*   (2023.01)

(52) U.S. Cl.
CPC ..... *G06Q 20/4016* (2013.01); *G06Q 20/4015* (2020.05); *G06Q 30/0214* (2013.01)

(58) Field of Classification Search
CPC ....................... G06Q 30/0207–0239
See application file for complete search history.

(56) References Cited

U.S. PATENT DOCUMENTS 10,402,844 B1 * 9/2019  Hust ............... G06Q 30/0641
10,515,366 B1 * 12/2019 Gorelik ............ G06Q 20/4016
11,080,737 B1 * 8/2021  Kalra .............. G06F 16/9566
2006/0136294 A1 * 6/2006 Linden ............. G06Q 30/0248
                                              709/224
2011/0055021 A1 * 3/2011 Haag ............... G06Q 30/0273
                                              705/14.69
2011/0131108 A1 * 6/2011 Doxey .............. G06Q 30/02
                                              705/26.1

(Continued)

OTHER PUBLICATIONS

Amarasekara, Bede. "Analysis, Design, and Simulation of Fraud and Vulnerability Management in Affiliate Marketing." Massey Unviersity of Auckland, New Zealand, 2016. (Year: 2016).*

(Continued)

*Primary Examiner* — Luis A Brown
(74) *Attorney, Agent, or Firm* — Bochner PLLC; Andrew D. Bochner

(57) ABSTRACT

A system for verifying affiliate leads on an electronic device which may include processors, computer-readable memories, and computer-readable storage devices. The system may also include program instructions stored on at least one of the storage devices for execution by at least one of the processors via at least one of the memories, the stored program instructions may include detecting at least one potential customer transaction; assigning, to each transaction, a unique transaction identifier; assigning, to each transaction, at least one transaction parameter; selecting at least one transaction parameter; flagging, or not flagging, the transaction based on at least one selected transaction parameter. If the transaction is not flagged, the stored program instructions may further include firing an affiliate pixel. If the transaction is flagged, the stored program instructions may further include recording the unique transaction identifier and holding the affiliate pixel in a QA state.

8 Claims, 4 Drawing Sheets

(56) References Cited

U.S. PATENT DOCUMENTS

| | | |
|---|---|---|
| 2011/0251869 A1* | 10/2011 | Shekhter ............ G06Q 10/0635 |
| | | 705/7.28 |
| 2016/0173693 A1* | 6/2016 | Spievak ............. G06Q 30/0269 |
| | | 379/265.09 |
| 2016/0260099 A1* | 9/2016 | Canis ................. G06Q 20/4016 |
| 2019/0122258 A1* | 4/2019 | Bramberger ............. G06N 3/08 |
| 2019/0303942 A1* | 10/2019 | Balaraman ............ H04L 9/3239 |
| 2020/0034831 A1* | 1/2020 | Blatt .................... G06Q 20/382 |
| 2020/0111037 A1* | 4/2020 | Mondal ................ H04W 4/025 |
| 2020/0242610 A1* | 7/2020 | Liu ..................... G06F 18/2411 |
| 2020/0349575 A1* | 11/2020 | Karmakar ............... G06F 17/15 |
| 2023/0050048 A1* | 2/2023 | Chauhan ............ G06Q 30/0609 |

OTHER PUBLICATIONS

Mathrani, Anuradha, et al. "Exploring Risk and Fraud Scenarios in Affiliate Marketing Technologies from the Advertiser's Perspective." Australian Conference on Information Systems, Adelaide Australia, 2015. (Year: 2015).*

* cited by examiner

QUALITY ASSURANCE SYSTEM FOR AUTHENTICATING ONLINE MERCHANT ACTIVITY

FIELD OF INVENTION

The present invention is in the field of authentication systems, specifically the authentication of online transactions.

INTRODUCTION

Advertisers in the high-volume Cost Per Action ("CPA") space all have the same problem in which they pay a bounty for every sale/lead/conversion that is generated by an affiliate. Pixels allow affiliates to track conversions or sales events they have generated. This system poses problems in that it takes massive teams of people to call, confirm, and/or validate transactions to which pixels were fired. As CPA volume increases, fraud becomes a problem as affiliates generate illegitimate leads.

Left unchecked, fraudulent sales can lead to dire consequences for the merchant. Fraudulent transactions frequently result in chargebacks when the fraudulent transaction is flagged by the customer. Too many chargebacks against a merchant can result in the merchant's account being locked, fines for each chargeback, or restricted access to online transactions for up to multiple years.

Accordingly, it would be desirable to have an effective system that detects fraudulent leads and allows advertisers to obtain a true random sampling of affiliate leads that is easy to manage.

SUMMARY

In an aspect of this disclosure, the system includes an electronic device comprising one or more processors, one or more computer-readable memories, and one or more computer-readable storage devices. The electronic device may also include program instructions stored on at least one of the one or more storage devices for execution by at least one of the one or more processors via at least one of the one or more memories. The stored program instructions may include detecting at least one potential customer transaction, assigning to each potential customer transaction, a unique transaction identifier, assigning, to each potential customer transaction, at least one transaction parameter, selecting at least one potential customer transaction, and at least one transaction parameter, and either flagging, or not flagging, the potential customer transaction based on at least one transaction parameter. If the potential customer transaction is not flagged, the stored program instructions may cause the firing of an affiliate pixel. If the potential customer transaction is flagged, the stored program instructions may further include recording the unique transaction identifier and holding the affiliate pixel in a hold state.

In an embodiment, the transaction parameter is at least one of time, date, customer location, affiliate identity, publisher identity, or payment method.

In another embodiment, the potential customer transaction is detected when a potential customer clicks a uniform resource locator which is associated with an affiliate.

In yet another embodiment, the potential customer transaction is detected when a potential customer completes a purchase which is associated with an affiliate.

In another embodiment, the stored program instructions further include showing to a user, via the electronic device, the unique transaction identifier and at least one transaction parameter. The stored program instructions may then further include receiving an "approved" or "denied" input from the user. If the input is approved, the potential customer transaction may be categorized as verified and the affiliate pixel may then be fired. If the input is denied, the potential customer transaction may be categorized as fraudulent, and the pixel may not be fired.

In yet another embodiment, selecting at least one potential customer transaction may be achieved via a randomized logic sequence.

In an embodiment, the system may further include assigning each of the at least one transaction parameter a weight.

In another embodiment, the system may further include either flagging, or not flagging, the potential customer transaction based on at least one selected transaction parameter and weight.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
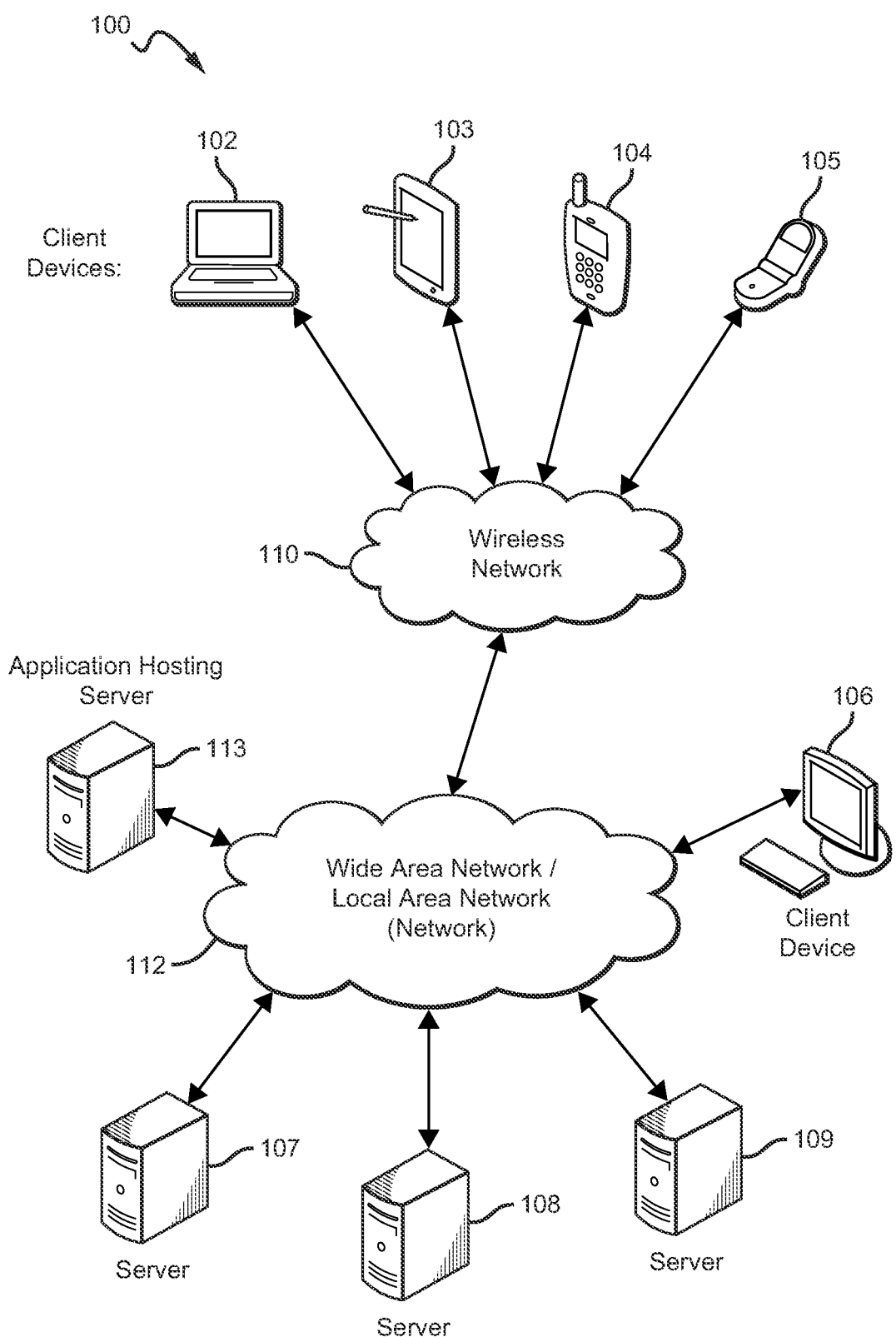
FIG. 1 illustrates a block diagram of a distributed computer system that can implement one or more aspects of an embodiment of the present invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. Various of the client devices 102-106 may include, for example, desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
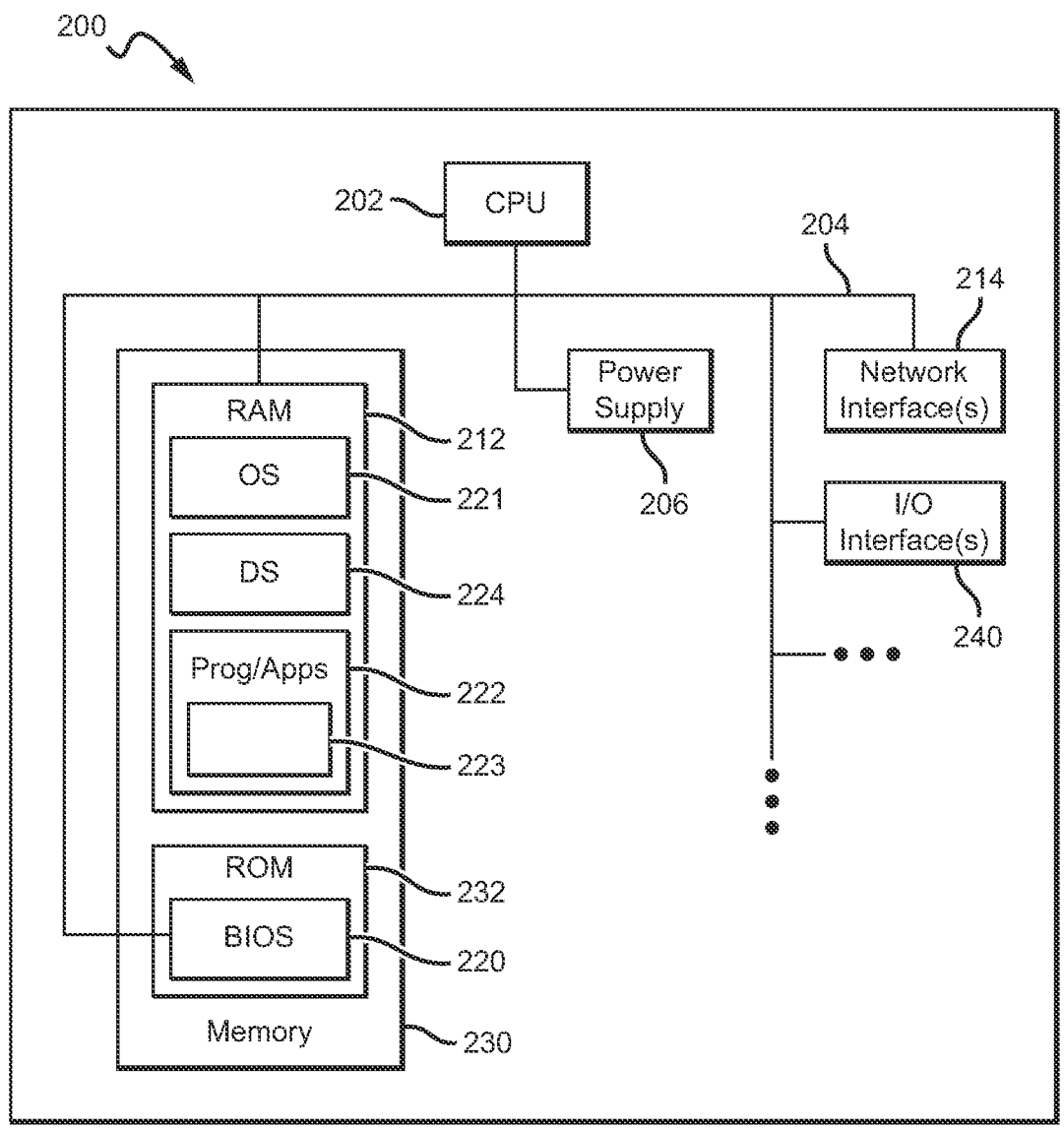
FIG. 2 shows illustrates a block diagram of an electronic device that can implement one or more aspects of an embodiment of the invention.
Figure 3:
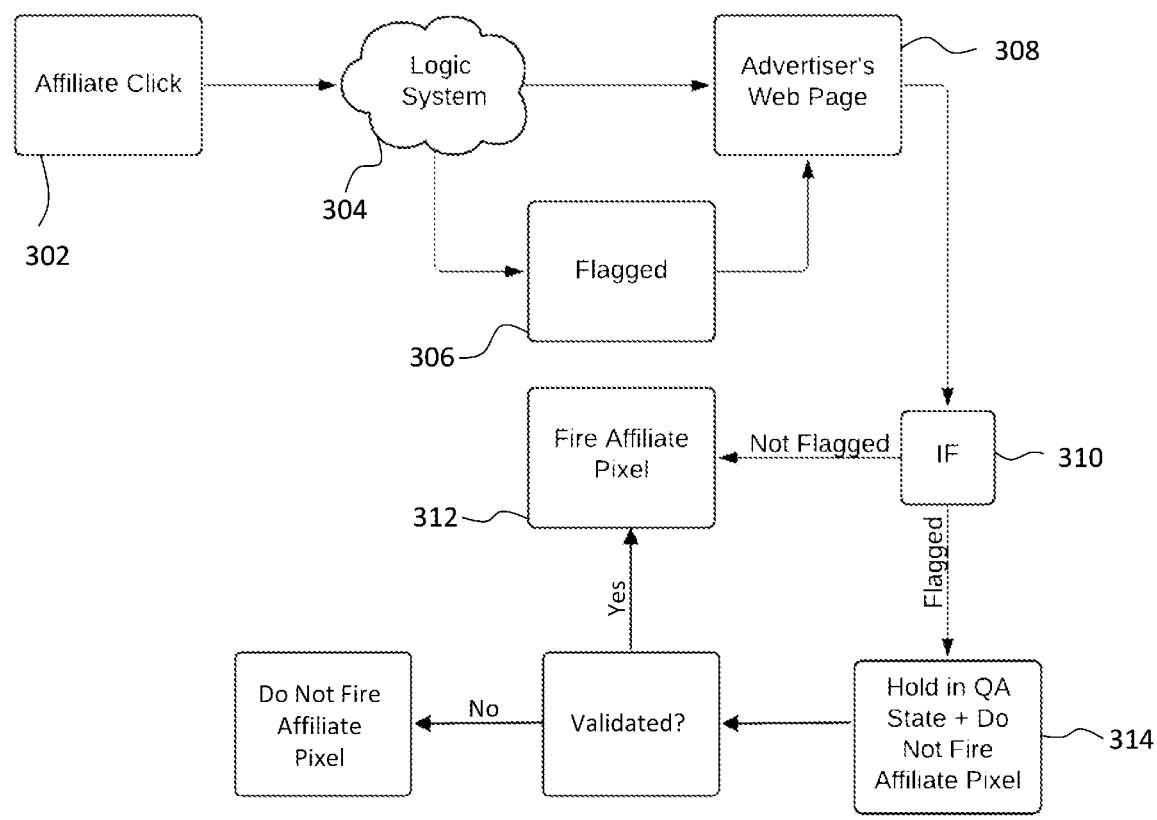
FIG. 3 shows a block diagram of an embodiment of the system as implemented when monitoring affiliate clicks.

FIG. 2 illustrates a block diagram of an electronic device 200 that can implement one or more aspects of an apparatus, system and method for increasing mobile application user engagement (the "Engine") according to one embodiment of the invention. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software and other tools necessary to implement or facilitate methods and systems according to embodiments of the invention. The elements may exist on a single computer or be distributed among multiple computers, servers, devices or entities.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MIMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present invention include apparatuses, systems, and methods implementing the Engine. Embodiments of the present invention may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

Referring to FIG. 1, the system may include an affiliate click 302. This affiliate click 302 may be activated when a potential customer accesses a Uniform Resource Locator (hereinafter "URL"). The URL may be accessed directly by the potential customer using a web browser, or indirectly by the potential customer by accessing the URL through an email or online advertisement. In an embodiment, the URL is associated with an affiliate. The affiliate click 302 may be any affirmative selection made by the potential customer (as non-limiting examples, selecting a button on a mobile application, dialing a phone number, or making a selection via a call tree). An affiliate may be an individual or entity which generates traffic or leads to a company's products and/or services. As a non-limiting example, the entity is a third-party publisher.

The affiliate click 302 may include certain types or information. In an embodiment, information may be obtained via Server-to-Server communication. However, information may also be obtained via HTTP cookies. The types of information may include the time and date on which the affiliate click 302 was activated, the location of the potential customer, affiliate identity, or publisher identity. The affiliate click 302 may also include a potential customer Internet Protocol (hereinafter "IP") address. The information may also include, which network or publisher generated the click, the advertisement id, the creative id, the advertisement group, the headline, and/or the superscript to track exactly where the sale originated from, which may be passed in the query string.

The time and date on which the affiliate click was activated may be ascertained using the location of the potential customer. The time and date may also be determined based on the internal time and date setting of the potential customer's device.

The location of the potential customer may be determined by the potential customer's IP address, or by an internal GPS device of the potential customer's device. The location of the potential customer may also be determined by any other means known to those skilled in the art. In a further embodiment, the GPS coordinates may be compared to an address or other location identifier provided by the potential customer during account registration or filling out a purchase form. If the GPS coordinates and the secondary location information do not match, then the transaction may be flagged for fraud.

The affiliate identity may be assigned to an anonymous identifier value that is unique to each affiliate. In an embodiment where such information is anonymized, the affiliate identity and/or anonymous identifier value may contain metadata enabling an administrator to determine one's identity.

The system may also include a randomized logic sequence to isolate random sales for manual review or discovery 304. An example of code for a randomized logic sequence is presented below:

```
function shuffle_assoc($list) {
    if (!is_array($list)) return $list;
    $keys = array_keys($list);
    shuffle($keys);
    $random = array( );
    foreach ($keys as $key)
        $random[$key] = $list[$key];
    return $random;
}
```

In an embodiment, the logic system 304 receives the types of information associated to each affiliate click 302. Depending on the geographical location, a particular offer may wish to accept the sale. However, any sale originating outside of that geographical location (for example, based on IP) may be flagged and transferred into a QA state. Additionally, the logic system 304 may evaluate other rules such as "known fraudulent sales." "Known fraudulent sales" may incorporate a database of known, previous, and/or likely fraudster, where the fraudster database may be cross-referenced with the potential purchaser. Such a comparison may be deployed at the point of click. Further, in addition to geographic location, IP's associated with fraudulent activity, the browser user agent, the browser size, device type, frequency of clicks, and other items may be used to build a customized ruleset for flagging sales and isolating such transactions to a QA state. As a non-limiting example, a merchant may choose to isolate any sales outside of the USA, where the sales cause the page to load more than three times in five seconds or less. Further, in such a non-limiting example, a merchant may choose to isolate sales which originate an Android device. Android devices may often times be used for fraud because Android devices are more easily manipulated by computers with emulators. The logic system 304 may process the types of information based on a set of predefined rules. These predefined rules may be defined by a user, an administrator, or by a machine learning algorithm which is discussed in more detail below.

Based on the predefined set of rules, the logic system may flag, or not flag, at least one affiliate click 302. As a non-limiting example, the predefined set of rules may cause the logic system 304 to flag an affiliate click 302 based on a combination of the types of information, such as the affiliate click 302 being activated at midnight where the potential customer is located, or the affiliate identity and the location of the potential customer. In an embodiment, the predefined set of rules of the logic system 304 may flag the affiliate click 302 based on just one type of information. In other embodiments, the predefined set of rules of the logic system 304 may flag the affiliate click 302 based on two types of information, three types of information, or any quantity of types of information. Each type of information may be weighted such that each type of information of the affiliate click 302 has a different impact on whether the affiliate click 302 is flagged or not flagged. As a non-limiting example, the time and date in which the affiliate click was activated may be assigned greater weight than the location of the potential customer. The types of information may be weighted in correlation with previous fraudulent transactions. For example, if more fraudulent transactions occur at midnight than at other times, then affiliate clicks 302 activated at midnight may be assigned a greater weight, increasing the probability that the affiliate clicks 302 will be flagged. As another non-limiting example, if a geographical location is known to account for a disproportionate percentage of fraud, and if a potential customer is located in such a region, the location information may hold a greater weight in the analysis. In another embodiment, temporal information from a potential customer may be cross-referenced with the potential customer's alleged time zone. For example, if the affiliate click 302 occurs at an uncharacteristic time in reference to the alleged time zone, the affiliate click 302 may be flagged and/or the temporal information may hold greater weight in analysis.

The logic system 304 may implement a machine learning algorithm to identify which affiliate clicks 302 to flag. In yet another embodiment, the predefined set of rules may be defined by the machine learning algorithm. In such an embodiment, the machine learning algorithm receives feedback from types of information contained in affiliate clicks 302 which are later determined to be fraudulent or authentic. The machine learning algorithm may then define the set of rules used by the logic system 304 based on this feedback so that types of information which have been identified in previous fraudulent transactions increase the probability of an affiliate click 302, which has the same types of information, being flagged in the current transaction.

The machine learning algorithm may also be trained to identify types of information that are outliers. As a non-limiting example, the machine learning algorithm identifies common relationships between the different type of information relating to the affiliate click 302. In such an example, any type of information identified by the logic system 304 as being outside of an identified common relationship has an increased probability of being flagged 306.

The logic system 304 may also contain rules to limit how many affiliate clicks 302 the logic system 304 processes in a specific amount of time. This may be done to decrease the processing power needed to monitor affiliate clicks 302. In an embodiment, the predefined rules may dictate how may affiliate clicks 302 should be processed by the logic system 304 in one day, one hour, or any timeframe that may be useful for limiting how many affiliate clicks 302 are processed by the logic system 304.

Once the affiliate click 302 has been processed by the logic system 304, the potential customer is directed to the advertiser's web page 308. The advertiser's web page 308 may belong to the company to which the affiliate is affiliated. Alternatively, the advertiser's web page may be a third-party webpage selling the company's products and/or services. In one embodiment, the processing of the affiliate click 302 may occur while the customer is on the advertiser's webpage (for example, via Javascript), but before any sale has been converted. In another embodiment, the processing of the affiliate click 302 may occur after the customer leaves the advertiser's webpage.

In an embodiment, once the potential customer completes a qualifying transaction, the system uses an IF function 310 to determine whether or not an affiliate pixel is fired. A qualifying transaction may be an online purchase of the company's products and/or services. Other qualifying transactions may include the affiliate click 302, interaction with the advertiser's web page 308, or any transaction which results in an incentive being generated for an affiliate. In an embodiment, each qualifying transaction includes transaction information. The transaction information may include the same types of information contained in the affiliate click 302, but may further include a transaction identifier value, type of payment, purchase amount, customer identifier, or any other information generated by a qualifying transaction and known to those skilled in the art.

In an aspect of the current disclosure, once a potential customer completes a qualifying transaction, the IF function 310 of the system may carry out one of two functions. In an embodiment, if the affiliate click is flagged, then information relating to the transaction is held in a QA state, and an affiliate pixel is not fired 314 until the transaction has been reviewed and authenticated. In another embodiment, if the affiliate click 302 has not been flagged, then information relating to the transaction is not held in a QA state, and an affiliate pixel is fired 312.

An affiliate pixel may be a piece of HTML, code that is placed on the advertiser's web may be an iFrame pixel which is placed in the form of a built-in frame on the advertiser's web page 308 landing page. Alternatively, the affiliate pixel may also be an image pixel placed as a 1×1 image on the landing page of the advertiser's web page 308. Another form of affiliate pixels may be as JS pixels added as a script to the code of the advertiser's web page 308.

Instead of an affiliate pixel, Server-to-Server ("S2S") postback tracking may be used. In an embodiment, a combination of affiliate pixels and S2S tracking may be used. S2S tracking may include generating a click ID value via an HTTP request that is used for tracking purposes. Once a qualifying transaction occurs, S2S tracking may send the affiliate click 302 identifier value and information, via an affiliate network, to the company's tracking software.

The QA state may be a state in which the affiliate click 302, types of information, and affiliate identifier are held within a data log. The data log may contain the aforementioned types of information and affiliate identifiers belonging to each flagged affiliate click 302. The data log may also include transaction information relating to the qualifying transaction. In an embodiment, the data log is displayed, via an electronic device, to a user. In such an embodiment, the user reviews the information pertaining to each affiliate click 302. After reviewing each flagged affiliate click 302 on the data log, the user may identify the affiliate click 302 as fraudulent or authentic. In an embodiment, the user is a machine learning algorithm. In another embodiment, the user is a person.

In an embodiment, if the affiliate click 302 is identified as fraudulent, the affiliate pixel is not fired, and the S2S postback tracking does not send the affiliate click 302 identifier value and information, via the affiliate network, to the company's tracking software. In an embodiment, if the affiliate click is identified as authentic, the affiliate pixel is fired, or the S2S postback tracking sends the affiliate click 302 identifier value and information, via the affiliate network, to the company's tracking software.

Figure 4:
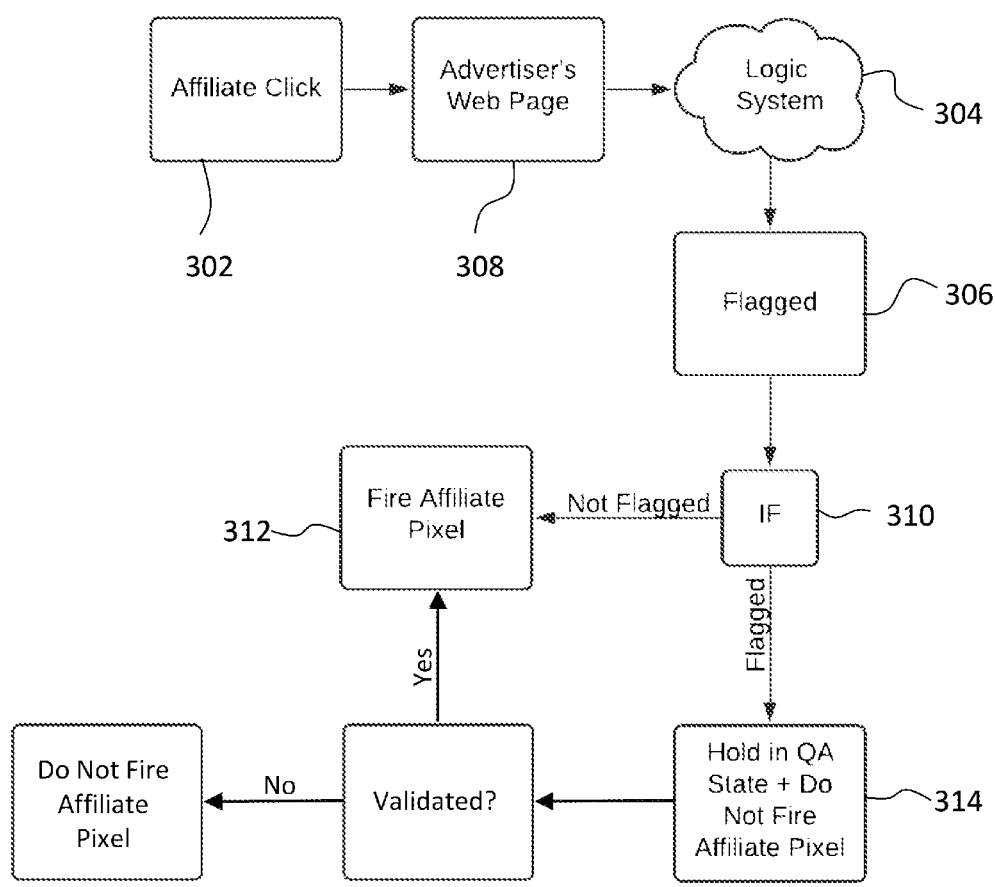
FIG. 4 shows a block diagram of an embodiment of the system as implemented when monitoring qualifying transactions/conversions.

Referring to FIG. 4, in an aspect of the present disclosure the logic system 304 receives and processes transaction information associated to a qualifying transaction on the advertiser's web page 308. The logic system 304 may then flag the transaction information based on the predetermined rules. In an embodiment, the transaction information may be processed by the logic system 304 together with the types of information associated with the affiliate click 302.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A system for verifying affiliate leads, on an electronic device comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

detecting at least one potential customer transaction;

assigning, to each potential customer transaction, a unique transaction identifier;

assigning, to each potential customer transaction, at least one transaction parameter;

selecting at least one potential customer transaction, and at least one transaction parameter;

either flagging, or not flagging, the potential customer transaction based on at least one selected transaction parameter, wherein, if the potential customer transaction is not flagged, the stored program instructions further include firing an affiliate pixel;

wherein, if the potential customer transaction is flagged, the stored program instructions further include recording the unique transaction identifier and holding the affiliate pixel in a QA state;

showing to a user, via the electronic device, the unique transaction identifier and at least one transaction parameter; and receiving an approved or denied input from the user, wherein, if the input is approved, the potential customer transaction is categorized as verified and the affiliate pixel is fired, and wherein, if the input is denied, the potential customer transaction is categorized as fraudulent, and the pixel is not fired.

2. The system of claim 1, wherein the transaction parameter is at least one of time, date, customer location, affiliate identity, publisher identity, or payment method.

3. The system of claim 1, wherein the potential customer transaction is detected when a potential customer clicks a uniform resource locator which is associated with an affiliate.

4. The system of claim 1, wherein the potential customer transaction is detected when a potential customer completes a purchase which is associated with an affiliate.

5. The system of claim 1, wherein the at least one transaction parameter upon which the potential customer transaction is flagged or not flagged, is selected by a machine learning algorithm.

6. The system of claim 1, wherein selecting at least one potential customer transaction is achieved via a randomized logic sequence.

7. The system of claim 1, further including assigning each of the at least one transaction parameter a weight.

8. The system of claim 7, further including either flagging, or not flagging, the potential customer transaction based on at least one selected transaction parameter and weight.

* * * * *